(12) United States Patent
Bigot et al.

(10) Patent No.: US 10,884,183 B2
(45) Date of Patent: Jan. 5, 2021

(54) WEAKLY-COUPLED FEW MODE OPTICAL FIBERS FOR MODE DIVISION MULTIPLEXING AND CORRESPONDING OPTICAL TRANSMISSION SYSTEM

(71) Applicant: Draka Comteq France, Paron (FR)

(72) Inventors: Marianne Bigot, Paron (FR); Jean-Baptiste Trinel, Paron (FR); Pierre Sillard, Paron (FR); Louis-Anne De Montmorillon, Paron (FR)

(73) Assignee: DRAKA COMTEQ FRANCE, Paron (FR)

( * ) Notice: Subject to any disclaimer, the term of this patent is extended or adjusted under 35 U.S.C. 154(b) by 0 days.

(21) Appl. No.: 16/591,918

(22) Filed: Oct. 3, 2019

(65) Prior Publication Data
US 2020/0110217 A1 Apr. 9, 2020

(30) Foreign Application Priority Data
Oct. 8, 2018 (FR) ...................... 18 59325

(51) Int. Cl.
*G02B 6/02* (2006.01)
*G02B 6/028* (2006.01)
*H04B 10/2581* (2013.01)

(52) U.S. Cl.
CPC ....... *G02B 6/0288* (2013.01); *G02B 6/02042* (2013.01); *H04B 10/2581* (2013.01)

(58) Field of Classification Search
CPC .... G02B 6/0288; G02B 6/02; G02B 6/02042; H04B 10/2581
See application file for complete search history.

(56) References Cited

U.S. PATENT DOCUMENTS 7,171,090 B2   1/2007  Mattingly, III et al.
8,588,569 B2 * 11/2013  Bookbinder ........... G02B 6/028
                                                385/124

(Continued)

FOREIGN PATENT DOCUMENTS

| CN | 105866881 A  | 8/2016 |
| WO | 201109440 A2 | 8/2011 |
| WO | 2015092464 A1| 6/2015 |

OTHER PUBLICATIONS

M. Bigot et al., "Next-Generation Multimode Fibers for Space Division Multiplexing", Advanced Phototonics Congress (2017), (3 pages total).

(Continued)

*Primary Examiner* — Jennifer Doan
(74) *Attorney, Agent, or Firm* — Shumaker, Loop & Kendrick, LLP

(57) ABSTRACT

A few-mode optical fiber including a core's refractive-index profile $\Delta n(r)$ of trapezoid-like shape. The optical core having a center part of radius R1 and a transition part ranges from the radius R1 to a radius R2, such that R2>R1 with R2 between 6.8 and 11.5 μm, said refractive-index profile being defined by a surface integral of the core index profile of between $180 \times 10^{-3}$ and $270 \times 10^{-3}$ μm; a transition slope S of between $1.7 \times 10^{-3}$ and $12 \times 10^{-3}$ μm$^{-1}$; with $\Delta n1$ and $\Delta n2$ the refractive-index difference respectively of the center part of the optical core and of the cladding part adjacent to the optical core, with respect to the outer optical cladding.

16 Claims, 2 Drawing Sheets

(56) References Cited

U.S. PATENT DOCUMENTS

Figure 1:
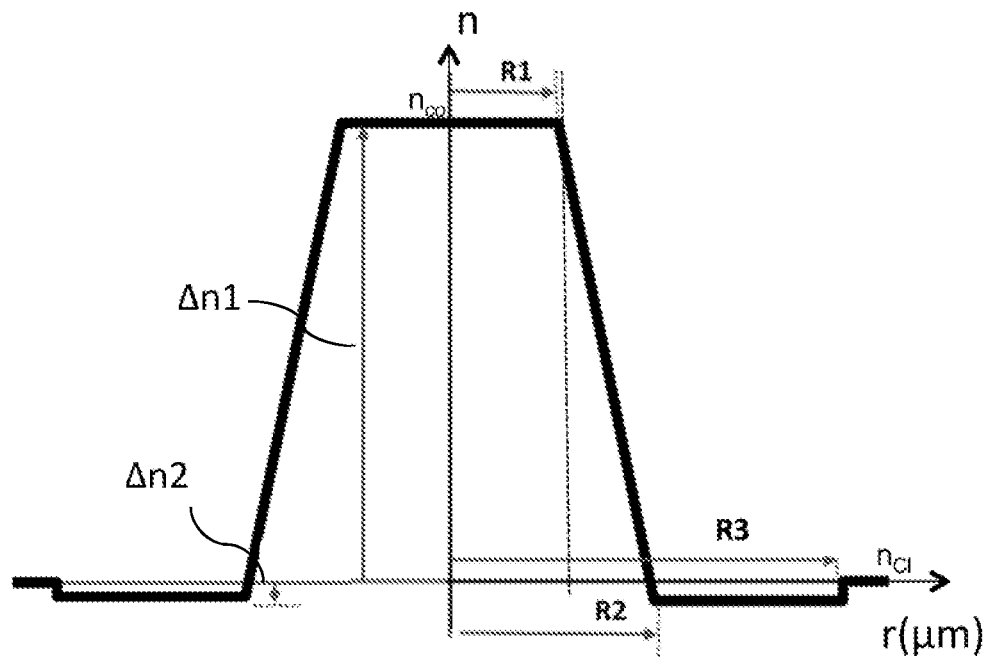

| | | | |
|---|---|---|---|
| 9,477,037 B1* | 10/2016 | Bickham | G02B 6/0365 |
| 2002/0054743 A1 | 5/2002 | Montmorillon et al. | |
| 2014/0064686 A1 | 3/2014 | Lars et al. | |
| 2015/0168643 A1 | 6/2015 | Gruner-Nielsen et al. | |
| 2016/0306108 A1 | 10/2016 | Sun | |
| 2016/0370540 A1 | 12/2016 | Balemarthy et al. | |
| 2017/0031089 A1 | 2/2017 | de Montmorillon et al. | |

OTHER PUBLICATIONS

Sillard et al., "Low-Differential-Mode-Group-Delay 9-LP-Mode Fiber", Journal of Lightwave Technology, vol. 34, No. 2. Jan. 15, 2016 (p. 425-430).

Dawei Ge et al., "Design of a Weakly-Coupled Ring-Core FMF and Demonstration of 6-mode 10-km IM/DD Transmission", Optical Society of America, (2018), (3 pages total).

Lin Ma et al., "Ring-Assisted 7-LP-Mode Fiber with Ultra-Low Inter-Mode Crosstalk" Asia Communications and Photonics Conference (2016), (3 pages total).

M.E. Lines et al., "Explanation of anomalous loss in high delta Singlemode fibres", Electronics Letters, vol. 35, No. 12, Jun. 10, 1999 (p. 1009-1010).

Mazumder et al., "Analysis of excess scattering in optical fibers", Journal of Applied Physics, vol. 96, No. 8, Oct. 2004 (p. 4042-4049).

* cited by examiner

WEAKLY-COUPLED FEW MODE OPTICAL FIBERS FOR MODE DIVISION MULTIPLEXING AND CORRESPONDING OPTICAL TRANSMISSION SYSTEM

1. FIELD OF THE DISCLOSURE

The present disclosure relates to the field of fiber optic transmission, and, more specifically, to improved few-mode fiber designs for mode division multiplexing.

2. BACKGROUND

An optical fiber is conventionally constituted of an optical core, which transmits an optical signal, and of an optical cladding, which confines the optical signal within the optical core. To that end the refractive index of the core, $n_{co}$, is greater than the one of the cladding, $n_{Cl}$. An optical fiber is generally characterized by a refractive index profile that associates the refractive index (n) with the radius (r) of the optical fiber: the distance r with respect to the center of the optical fiber is shown on x-axis and the difference $\Delta n$ between the refractive index at radius r, n(r), and the refractive index of the optical cladding $n_{Cl}$ is shown on y-axis.

Nowadays, two main categories of optical fibers exist: multimode fibers and single-mode fibers. In a multimode fiber, for a given wavelength, several optical modes can propagate simultaneously along the optical fiber, whereas in a single-mode fiber, the higher order modes (hereafter called HOMs) are cut-off or highly attenuated.

Single-mode fibers are commonly used for long-distance applications, such as access networks, metropolitan networks or long-haul networks. To obtain an optical fiber capable to transmit a single-mode optical signal, a core with a relatively small diameter is required (typically between 5 μm and 13 μm). To meet requirements of high speed or bit-rate applications (for example 10 Gbps), standard single-mode fibers require use of a modulated single-mode laser emitter tuned to work typically at a wavelength of 1550 nm. However, single-mode fibers suffer from nonlinearity problems, which are major limitations on fiber transmission capacity.

Multimode fibers are commonly used for short-distance applications requiring a high bandwidth, such as local area networks (LANs) and multi-dwelling units (MDUs), more generally known as in-building networks. The core of a multimode fiber typically has a diameter of 50 μm, or 62.5 μm. The most prevalent multimode fibers in telecommunications are the refractive graded-index profile optical fibers. By minimizing the intermodal dispersion (i.e. the difference between the propagation delay times of the optical modes along the optical fiber, also called DMGD for Differential Mode Group Delay), such a refractive index profile guaranties a high modal bandwidth for a given wavelength.

Since data traffic over fiber optic networks continues to grow exponentially, there is an increasing demand for increasing per-fiber traffic particularly across long distances. To this end, multiplexing techniques have been developed that allow a plurality of separate data streams to share the same optical fiber. Among these techniques, one promising approach is space division multiplexing (SDM), in which a plurality of data channels within a single optical fiber are provided by a respective plurality of optical signal modes guided by the fiber. Such a technique has required the development of new types of optical fibers, called few-mode optical fibers, which support more than one spatial mode but fewer spatial modes than the multi-mode fibers. Such Few-Mode Fibers (FMFs), which are notably discussed in the PCT patent document WO2011/094400, support at least two Linear Polarization (LP) modes.

Space-division-multiplexed transmissions using FMFs have hence recently received considerable attention because of their potential to multiply the capacity of single-mode transmissions by the number of modes that will be used. Depending on the design of the FMFs, the spatial modes transmitted may be coupled benefiting from a relatively low accumulated group delay.

One approach to the design of FMFs consists in minimizing the mode coupling (hereafter called weakly-coupled FMFs) so that all LP modes can be simultaneously detected without multiple-input multiple output (MIMO) technique or using a simple '2N×2N' MIMO technique (e.g. N being the total number of spatial modes which is equal to 1 or 2), regardless the number of LP modes that is one of the limiting factor to bridge long distances. Therefore, such a weakly-coupled FMFs allow for a simplification of the electronic processing of the optical signal.

In order to ensure a quality coupling between spatial modes, weakly-coupled FMFs are designed such that the minimal effective index difference (hereafter referred to as $\Delta n_{\text{eff min}}$) between subsequent spatial modes (hereafter called minimal inter-mode effective index difference) is of the highest possible value.

Increasing the number of LP modes that can actually be used in weakly-coupled FMFs is a challenging issue against mode coupling and losses for transmitted LP modes.

A way to increase the number of spatial modes without reducing $\Delta n_{\text{eff min}}$ would be to increase the core refractive index. However, this would lead to raise the attenuation of transmitted optical signals, which would not be optimal.

So far, step-index-core profiles have proven to be very well adapted to weakly-coupled FMFs because this kind of profile allows to get trade-off between:

- the inter-mode effective index difference (that has to be as high as possible: typically, the smallest effective index difference $\Delta n_{\text{eff min}}$ is higher than $0.9 \times 10^{-3}$ between two subsequent LP modes) in order to limit mode coupling; and
- the effective area $A_{\text{eff}}$ of all the spatial modes (that has to be as large as possible: typically, $A_{\text{eff}}$ upper than 80 μm²) in order to limit intra-mode non-linearity.

The publication of Mrs. Bigot ET Al, for example, entitled "Next-Generation Multimode Fibers for Space Division Multiplexing", 2017 Jul. 24, discloses examples of step-index-core profiles which have proven to be very well adapted to weakly-coupled FMFs. The experimental index profiles have been measured at a wavelength of 665 nm. Thus, because of the lack of resolution of measurement at that wavelength, the refractive near field experimental measurement of index-step profile is "smoothed" at the top and the basis of the profile contrary to a theoretical index-step profile which exhibits a transition core/cladding with right-angled corner.

Besides the problem of attenuation of the optical signals, designers have also observed that weakly-coupled FMFs—like the step-index-FMFs—suffer from a significant attenuation difference between spatial modes (also called DMA for "Differential Mode Attenuation, typically when DMA>0.05 dB/km), which severally impacts the transmission capacity. In that case a complex amplification system must be implemented to compensate the associated losses. More particularly DMA impacts mode-dependence losses with highest optical losses for the higher order modes. One origin of higher attenuation of the highest order modes can be their coupling with cladding and leaky modes and microbending effects. Another origin for the unexpected extra losses occurring for the highest order modes in step-index profiles could be a relatively high contribution of small angle light scattering effect (SALS).

One approach to reduce DMA by limiting coupling of high order modes with cladding and leaky modes is to act on the refractive index profile at the cladding/core interface. For example, patent document US 2016/0306108 discloses a few-mode fiber, having a graded-index core and a surrounding cladding comprising a layer between the core and the trench, a down-doped trench abutting the layer and an undoped cladding region abutting the trench. The fiber's refractive index profile is configured to support at least nine LP modes for transmission of a spatially-multiplexed optical signal. Although such designs are promising in terms of DMA by minimizing the coupling with non-guiding modes, they are not adapted to low-mode coupling FMFs. Indeed, graded-index core profiles allow to divide the LP modes supported by the fiber into mode groups whose modes within one mode group have the same effective index. Therefore, if the effective index differences in-between mode groups are sufficiently far from each other, coupling between mode groups can be low, but the different LP modes within one mode group are strongly coupled. This graded-index-core profile is thus used to combine both low Differential Group Delay and low DMA between spatial modes. But the trade-off between DMA and $\Delta n_{\mathit{eff}\ min}$ is not optimal enough (especially when using optical detection systems without MIMO or with a simple (2×2 or 4×4) MIMO technique that requires low mode coupling between LP modes) and requires complex and expensive transmission hardware.

There is therefore a need for designing a weakly-coupled FMF exhibiting a sufficient high effective index difference between LP modes while reducing the DMA, in order to enhance the capacity of transmission of spatially-multiplexed optical signals.

3. SUMMARY OF THE DISCLOSURE

In one particular embodiment of the present disclosure, an optical fiber is proposed comprising a optical core surrounded by an optical cladding, wherein the optical core has a refractive-index profile $\Delta n(r)$ of trapezoid-like shape, as a function of a radial distance r from the center of the optical core, the optical core having a center part of radius R1 and a transition part ranges from the radius R1 to a radius R2, such that R2>R1, said refractive-index profile being defined by:

a surface integral $A_{core}$ defined as follows:
$A_{core}=2\int_0^{R2}\Delta_n\Delta n(r)\cdot dr$
a transition slope S defined as follows:

$$S = \left|\frac{\Delta n2 - \Delta n1}{R2 - R1}\right|$$

with:
$\Delta n1$, the refractive-index difference of the center part of the optical core with respect to the outer optical cladding;
$\Delta n2$, the refractive-index difference of a cladding part, adjacent to the optical core, with respect to the outer optical cladding;

and wherein:
the surface integral $A_{core}$ is between $180\times10^{-3}$ and $270\times10^{-3}$ µm;
the radius R2 is between 6.8 and 11.5 µm;
the transition slope S is between $1.7\times10^{-3}$ and $12\times10^{-1}$.

Such a weakly-coupled few mode optical fiber exhibiting a sufficient high effective refractive index difference between spatial modes, compared to prior art FMF fibers, while keeping a differential mode attenuation as low as possible. The present invention relies on an astute index profile trapezoid-like shape between the optical core and cladding designed to decrease the diffusion phenomena at the interface core/cladding, so as to notably decrease the SALS component of the DMA. Such a trapezoid shape allows reducing the extra scattering losses in the FMF. Therefore, rather than focusing on coupling effects between highest order modes and cladding modes that penalizes attenuation of the high order modes like in prior art solutions, the present invention is based on the index profile design for FMF that reduces SALS contribution so as to reduce DMA.

Such approach allows to significantly improve the trade-off between a high inter-mode effective index difference and a low DMA as well. Typically, such a weakly-coupled FMF allows to get an inter-mode effective index difference $\Delta n_{\mathit{eff}\ min}$ equal to or upper than $0.9\times10^{-3}$ combined with a DMA equal to or lower than 0.05 dB/km.

According to a particular feature, the center part of the optical core is defined by a surface integral $A_{core}$, defined by the following equations:

$A_{core}=2\int_0^{R2}\Delta n(r)\cdot dr=(\Delta n1-\Delta n2)\times(R1+R2)$

According to a particular feature, the refractive-index difference $\Delta n1$ is between $13\times10^{-3}$ and $18\times10^{-3}$.

According to a particular feature, a ratio R1/R2 of said center part's radius to said transition part's radius is between 0.30 and 0.85.

Such ratio ensures to get a weak mode coupling FMF as desired while keeping DMA as low as possible.

According to another particular feature, the refractive-index difference $\Delta n2$ is between $-1\times10^{-3}$ and $1\times10^{-3}$, and more particularly between $-0.5\times10^{-3}$ and $0.5\times10^{-3}$.

According to a particularly advantageous feature, the center part of the optical core comprises a region of depressed refractive index, called a inner depressed core, ranging from the center of the optical core to radius R0 and having a refractive-index difference with respect to the outer optical cladding $\Delta n0$ such that $\Delta n1>\Delta n0\geq(\Delta n1-6\times10^{-3})$.

Adding such depressed refractive-index portion in the center part of the optical core (inner depressed core) allows readjusting the inter-mode effective refractive index difference $\Delta n_{\mathit{eff}}$ so as to ensure an adequate separation between spatial modes that are guided in the FMF, thereby increasing the capacity of transmission of spatially-multiplexed optical signals, as compared to prior art FMFs.

According to another particular feature, the inner depressed core has a surface integral $A_0$ and assuming a surface integral $A_{trap}$ as the surface integral of depressless core's refractive-index profile, said surface integrals $A_0$ and $A_{trap}$ being defined as follows:

$A_0=2\int_0^{R0}(\Delta n1-\Delta n(r))dr$ $$A_{trap} = 2\left(\Delta n1 \cdot R1 + \int_{R1}^{R2}\Delta n(r)dr\right)$$

with a ratio $A_0/A_{trap}$ lower than or equal to 0.01.

Thus, with such a ratio, the trade-off between DMA and inter-mode effective index difference is more improved.

According to another particular feature, the transition slope S satisfies the following inequality:

$$S \geq J\left(\frac{A_0}{A_{trap}}\right)^2 + K\left(\frac{A_0}{A_{trap}}\right) + L$$

with $J=650\times10^{-3}$ µm$^{-1}$, $K=-78\times10^{-3}$ µm$^{-1}$ and $L=4.0\times10^{-3}$.

Such a profile allows getting an improved inter-mode effective index difference $\Delta n_{\mathit{eff\ min}}$ equal to or upper than $0.9\times10^{-3}$.

According to another particular feature, the transition slope S satisfies the following inequality:

$$S \geq J\left(\frac{A_0}{A_{trap}}\right)^2 + K\left(\frac{A_0}{A_{trap}}\right) + L$$

with $J=1900\times10^{-3}$ µm$^{-1}$, $K=-209\times10^{-3}$ µm$^{-1}$ and $L=7.6\times10^{-3}$ µm$^{-1}$.

Such a profile allows getting a more improved inter-mode effective index difference $\Delta n_{\mathit{eff\ min}}$ equal to or upper than $1.3\times10^{-3}$.

According to another particular feature, the transition slope S satisfies the following inequality:

$$S \geq J\left(\frac{A_0}{A_{trap}}\right)^2 + K\left(\frac{A_0}{A_{trap}}\right) + L$$

with $J=5800\times10^{-3}$ µm$^{-1}$, $K=-580\times10^{-3}$ µm$^{-1}$ and $L=17\times10^{-3}$ µm$^{-1}$.

Such a profile allows getting an even more improved inter-mode effective refractive index difference $\Delta n_{\mathit{eff\ min}}$ equal to or upper than $1.5\times10^{-3}$.

According to another particular feature, each linear polarization mode guided by said optical fiber has an effective area $A_{\mathit{eff}}$ such that $A_{\mathit{eff}}>80$ µm$^2$.

Such an effective area limits intra-mode non-linearity in the FMF.

According to a particular aspect of the invention, at least five linear polarization modes are guided in the optical fiber.

According to another particular feature, a differential mode attenuation, DMA, for all the modes guided by said optical fiber is such that: DMA≤0.050 dB/km and more particularly DMA≤0.020 dB/km.

According to another particular feature, the transition part of the trapezoid-like core refractive-index profile comprises at least one dopant material of concentration gradually changing as a function of the radial distance r from a concentration in the center part of the optical core to a concentration in said cladding part adjacent to the optical core.

Applying a soft transition of one or several dopants can thus be used in the fiber core to create the transition part of the core index profile (ranging from radius R1 to radius R2).

According to another particular feature, said at least one dopant material belongs to the group comprising: Germanium oxide, Phosphorus oxide, Boron oxide, Fluorine, or other dopant material that affects the refractive index of silica.

According to another particular feature, the optical cladding has a refractive index between 1.437 and 1.458.

Another aspect of the disclosure concerns an optical system comprising at least one optical fiber as described here above in any of its embodiments.

4. LIST OF FIGURES

Figure 2:
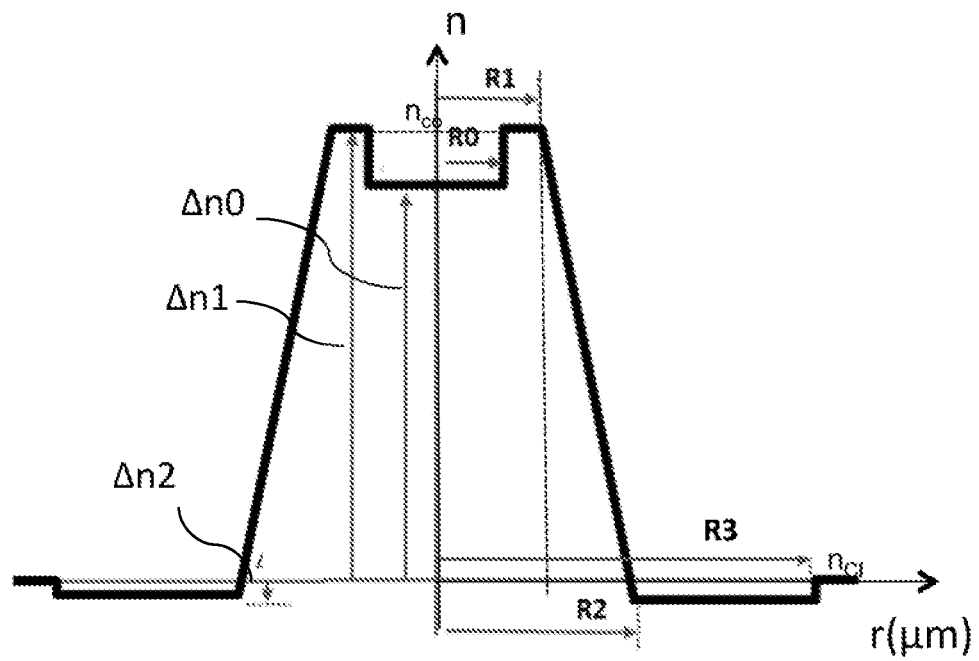
Figure 3:
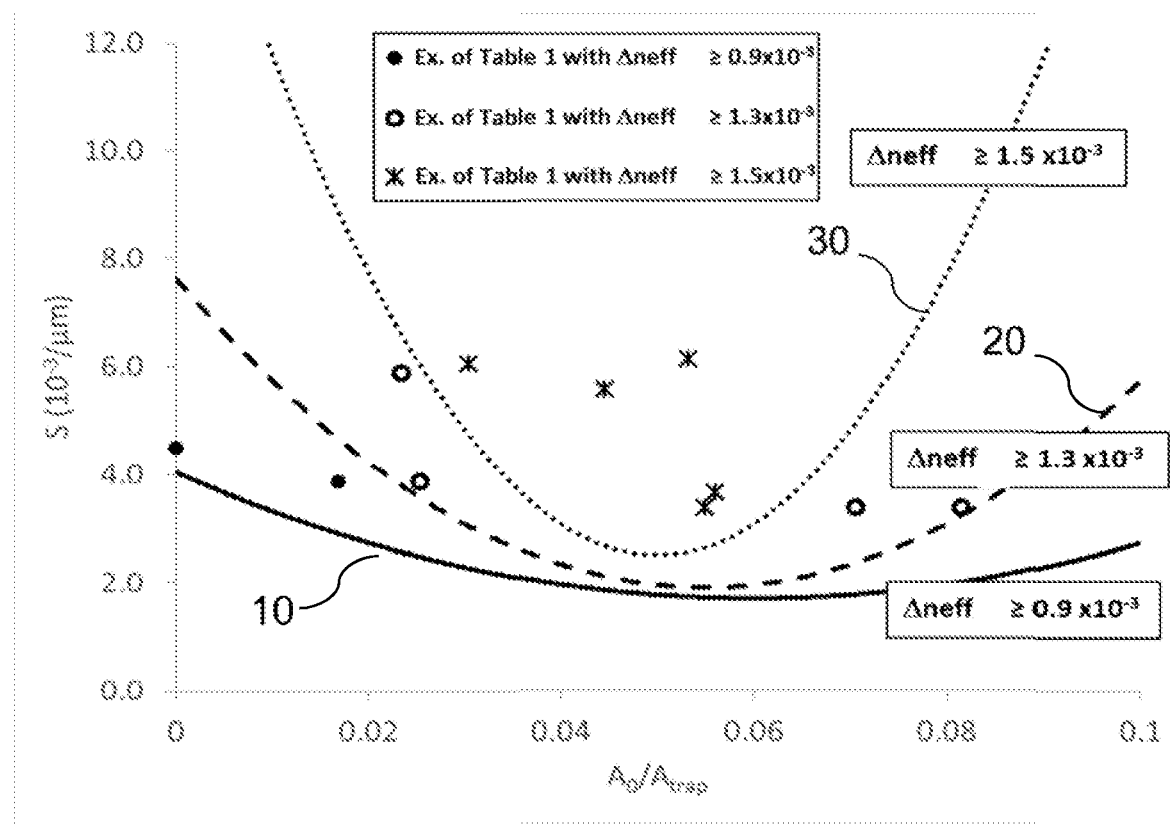

Other features and advantages of embodiments of the present disclosure shall appear from the following description, given by way of an indicative and non-exhaustive examples and from the appended drawings, of which:

FIG. 1 graphically depicts the refractive-index profile of an exemplary weakly-coupled FMF according to a first embodiment of the present disclosure;

FIG. 2 graphically depicts the refractive-index profile of an exemplary weakly-coupled FMF according to a second embodiment of the present disclosure;

FIG. 3 illustrates a graphic showing the impact of the transition slope of the trapezoid index profile and of the ratio $A_0/A_{trap}$ on the inter-mode index difference $\Delta n_{\mathit{eff\ min}}$ of the FMF.

5. DETAILED DESCRIPTION

The general principle of the present disclosure relies on a novel and inventive approach of designing FMFs with soft transition of the refractive-index profile from the optical core to the cladding, so that the extra light scattering losses in the FMF is significantly reduced while keeping a weakly-couple FMF. More precisely, the purpose of such a design is to optimize the refractive-index profile of the optical core, in order that the FMF is able to guide a plurality of weakly-couple spatial modes (typically at least five LP modes with a minimal inter-mode effective refractive-index difference $\Delta n_{\mathit{eff\ min}}$ equal to or greater than $0.9\times10^{-3}$) while having less DMA over prior art FMFs (typically DMA lower than 0.05 dB/km).

Light travelling in an optical fiber actually forms hybrid-type modes, which are usually referred to as LP (linear polarization) modes. The $LP_{0p}$ modes have two polarization degrees of freedom and are two-fold degenerate, the $LP_{mp}$ modes with m≥1 are four-fold degenerate. These degeneracies are not counted when designating the number of LP modes propagating in the fiber. Hence, a few-mode optical fiber having two LP modes supports the propagation of all of the $LP_{01}$ and $LP_{11}$ modes, or a few-mode fiber guiding six LP modes supports the propagation of all of the $LP_{01}$, $LP_{11}$, $LP_{02}$, $LP_{21}$, $LP_{12}$ and $LP_{31}$ modes.

Reference will now be made in detail to embodiments of few-mode optical fibers according to the invention, examples of which are illustrated in the accompanying drawings. Whenever possible, the same reference numerals will be used throughout the drawings to refer to the same or like parts.

The description therefore proposes two exemplary embodiments to obtain the desired trade-off between $\Delta n_{\mathit{eff\ min}}$ and DMA: a trapezoid index profile weakly-coupled FMF and a weakly-coupled FMF assisted by an inner depressed core. The second embodiment is detailed later in the description.

As used herein, $\Delta n_{\mathit{eff\ min}}$ means the minimum value of effective index difference, in absolute value, in between two subsequent LP modes guided in the optical fiber, and $\Delta n_{\mathit{eff}}$ is the effective index difference of a given LP mode with respect to the cladding refraction index.

Depressless Core Weakly-Coupled FMF

FIG. 1 depicts the refractive index profile n(r) of an optical fiber according to a first embodiment of the present invention. It describes the relationship between the refractive-index difference Δn as a function of the radial distance r, expressed in micrometers, from the center of the optical fiber. The x-axis represents radial position with x=0 representing the center of the optical core, and the y-axis represents refractive index, expressed as a refractive-index difference Δn. As used herein, the term "refractive-index difference" does not exclude a refractive-index difference of zero.

The optical fiber has an optical core surrounded by an optical cladding, and a coating surrounding the cladding. The coating may comprise several layers; for instance, the coating may be a dual-layer coating. The cladding is formed of two portions: an intermediate portion adjacent to the optical core and outer portion (also referred to as intermediate cladding and outer cladding respectively).

In this particular embodiment, the refractive-index profile has a trapezoid shape, and it presents (starting from the center of the fibre):
- a center part of the optical core having a radius R1 and a substantially constant refractive-index difference Δn1 with respect to the outer cladding;
- an annular part of the optical core, in which the refractive-index decreases, in substantially linear manner, up to the radial distance R2 from the index of the center part of the optical core to the index of the intermediate cladding;
- an intermediate cladding having a radius R3 and a substantially constant refractive-index difference Δn2 with respect to the outer cladding;
- an outer cladding ranging from the radius R3 to the end of the glass part of the FMF.

Throughout the present document, the aforesaid annular portion of the optical core is also called "transition part" of the core's trapezoid-like index profile.

The fibre as a whole thus constitutes a fibre having a so-called "trapezoid-like" profile.

As the cross-section of the FMF shown in FIG. 1 is circular-symmetric with respect to the center of the optical core, the resulting core's refractive-index profile has an isosceles trapezoid shape (the index profile is of symmetrical shape with respect to the center of the optical core (y-axis)).

As stated above, the center part of the core's profile has a substantially constant refractive-index difference Δn1 with respect to the outer cladding ($n_{cl}$), the transition part of the core's profile has a refractive-index difference which decreases substantially linearly with respect to the radial distance. This linear decrease is defined according to a slope S, so called "transition slope", defined by the following equation:

$$S = \left| \frac{\Delta n2 - \Delta n1}{R2 - R1} \right|$$

Hereafter each section or part of the optical fibre profile is defined using surface integrals. The term "surface" should not be understood geometrically but rather should be understood as the area under the profile curve having two dimensions (expressed here in micrometers).

According the invention, the center part of the optical core is defined by a surface integral $A_{core}$, defined by the following equations:

$$A_{core} = 2\int_0^{R2} \Delta n(r) \cdot dr = (\Delta n1 - \Delta n2) \times (R1 + R2)$$

The fiber parameters, such as radius R1 and R2, the refractive-index differences Δn1 and Δn2, are chosen to have a surface integral $A_{core}$ ranging in a predetermined range of values.

The FMF according to this exemplary embodiment typically has further the following properties:
- a surface integral $A_{core}$ of the core's index profile ranging between $180 \times 10^{-3}$ and $270 \times 10^{-3}$ μm;
- a ratio R1/R2 of the center part's radius to the transition part's radius ranging between 0.30 and 0.85;
- a transition part's radius R2 ranging between 6.8 and 11.5 μm;
- a refractive-index difference Δn1 ranging between $13 \times 10^{-3}$ and $18 \times 10^{-3}$;
- a refractive-index difference Δn2 ranging between $-1 \Delta 10^{-3}$ and $1 \times 10^{-3}$ and more particularly between $-0.5 \times 10^{-3}$ and $0.5 \times 10^{-3}$;
- a transition slope S ranging between $1.7 \times 10^{-3}$ and $12 \times 10^{-3}$ μm$^{-1}$.

Thanks to these profile parameters, FMFs according the invention are able to guide at least five LP modes while exhibiting an optimized trade-off between $\Delta n_{\textit{eff min}}$ and DMA. Here the inventors of the present invention discovered that such a profile parameter allow getting a low mode coupling (i.e. an increased minimal inter-mode effective refractive index difference $\Delta n_{\textit{eff min}}$) and a DMA low as well.

By "low mode coupling", it means the minimal inter-mode effective refractive index difference $\Delta n_{\textit{eff min}} \geq 0.9 \times 10^{-3}$ and by "low DMA", it means the differential mode attenuation DMA≤0.050 dB/km.

Such a trapezoid profile shape is achieved through a gradual change in the concentration of one or several dopant materials in the transition part of the optical core from R1 to R2. The gradual change in the dopant concentration is based on the desired value of the transition slope S (defined above). Many dopants may be used in the context of the present invention, such as, for example, Germanium and Phosphorus, which both allow increasing the refractive index, and Bore and Fluorine, which both allow decreasing the refractive index. The person skilled in the art will easily understand that these dopants (except for Fluorine) are present in the silica matrix in the form of Oxides. Hence, the use of Germanium as dopant means, for example, the use of Germanium Dioxide ($GeO_2$).

Weakly-Coupled FMF with Inner Depressed Core

FIG. 2 depicts the refractive index profile n(r) of an optical fiber according to a second embodiment of the present invention. FIG. 2 differs from FIG. 1 by the presence of an inner depressed core astutely sized in the refractive-index profile of the FMF, in order to guaranty an adequate separation between LP modes guided in the fiber.

As shown in the figure, the center part of the core profile comprises a region of depressed refractive index, called inner depressed core, ranging from the center of the optical core to the radius R0 and having a substantially constant refractive-index difference Δn0 with respect to the outer cladding ($n_{cl}$) such that: $\Delta n1 > \Delta n0 \geq (\Delta n1 - 6 \times 10^{-3})$. Adding such an inner depressed core in the center part of the optical core as shown in FIG. 2 allows readjusting the inter-mode effective index difference $\Delta n_{\textit{eff}}$ and improving the capacity of transmission of spatially-multiplexed optical signals, as compared to prior art FMFs. Therefore, in this exemplary embodiment, the core's trapezoid profile is in some way truncated to its center with a region of depressed refractive index to improve the mode coupling of the FMF. Such a trench has for instance an outer radius R0 between 0.8 μm and R1−0.8 μm.

As used herein, the term "inner depressed core" is used to designate a radial portion of the optical fibre having a refractive index lower than the refractive index of the optical core's center part.

Hereafter each section or part of the optical fibre profile is again defined using surface integrals. The term "surface" should not be understood geometrically but rather should be understood as the area under the profile curve having two dimensions (expressed here in micrometers).

According to the invention, the inner depressed core is defined by a surface integral $A_0$ as follow:

$$A_0 = 2\int_0^{R0} (\Delta n1 - \Delta n(r)) dr$$

Considering now the surface integral $A_{trap}$ as the surface integral of trenchless core's refractive-index profile, defined by the following equation:

$$A_{trap} = 2(\Delta n1 \cdot R1 + \int_{R1}^{R2} \Delta n(r) dr)$$

According this particular embodiment of the invention, the center part of the optical core is defined by the following surface integral $A_{core}$:

$$A_{core} = 2\int_0^{R2} \Delta n(r) \cdot dr = A_{trap} - A_0$$

The surface integrals $A_0$ and $A_{trap}$ are chosen to have a ratio $A_0/A_{trap}$ lower than or equal to 0.01. With such a ratio, the trade-off between DMA and $\Delta n_{eff\ min}$ is even more improved.

It should be noted that a ratio chosen with $A_0$ equal to zero reverts to exhibit the index profile of the first embodiment. It should also be noted that the properties discussed above in relation with FIG. 1 (R1/R2, R2, $\Delta n1$, $\Delta n2$, S) apply again here for this second exemplary embodiment.

The inventors of the present invention further discovered that the slope and the ratio $A_0/A_{trap}$ have an effect on the inter-mode effective refractive index difference $\Delta n_{eff}$, and they developed the following inequality to guaranty a guiding of at least five LP modes with a low mode coupling, while keeping DMA low (i.e. DMA≤0.050 dB/km):

$$S \geq J\left(\frac{A_0}{A_{trap}}\right)^2 + K\left(\frac{A_0}{A_{trap}}\right) + L$$

with $J=650\times 10^{-3}$ µm$^{-1}$, $K=-78\times 10^{-3}$ µm$^{-1}$ and $L=4.0\times 10^{-3}$ µm$^{-1}$ to get $\Delta n_{eff\ min} \geq 0.9\times 10^{-3}$ (referred to as 'Criterion 1'); or with $J=1900\times 10^{-3}$ µm$^{-1}$, $K=-209\times 10^{-3}$ µm$^{-1}$ and $L=7.6\times 10^{-3}$ µm$^{-1}$ to get $\Delta n_{eff\ min} \geq 1.3\times 10^{-3}$ (referred to as 'Criterion 2'); or with $J=5800.10^{-3}$ µm$^{-1}$, $K=-580\times 10^{-3}$ µm$^{-1}$ and $L=17\times 10^{-3}$ µm$^{-1}$ to get $\Delta n_{eff\ min} \geq 1.5\times 10^{-3}$ (referred to as 'Criterion 3').

Dopants may be used in the silica matrix, such as, for example, Bore Dioxide and/or Fluorine, to decrease the refractive index with respect to the refractive index ($n_{co}$) of the core's center part so as to obtain the inner depressed core with the desired index difference $\Delta n0$. This portion of the core is said "down-doped" with respect to the core's center part.

Alternatively, the concentration of refractive index increasing dopants, such as, for example Germanium oxide and/or Phosphorus oxide, is less in the inner depressed core having an index difference $\Delta n0$ than in the core center part having an index difference $\Delta n1$ from R0 to R1.

FIG. 3 illustrates a graphic showing the impact of the transition slope S of the trapezoid index profile on the $\Delta n_{eff\ min}$ of the FMF. This graphic exhibits the relationship between the slope S of the trapezoid index profile (y-axis) as a function of the surface integral ratio $A_0/A_{trap}$ (x-axis) (x=0 representing the first exemplary embodiment and x>0 representing the second exemplary embodiment). The curves 10, 20 and 30 represent the curves obtained by numerical simulation with fiber parameters that give, respectively, the following minimal inter-mode effective index differences: $\Delta n_{eff\ min} \geq 0.9\times 10^{-3}$ (continuous line), $\Delta n_{eff\ min} \geq 1.3\times 10^{-3}$ (broken line) and $\Delta n_{eff\ min} \geq 1.5\times 10^{-3}$ (dotted line). The black dots, black circles and black stars on the graphic are examples from Table 1 discussed below meeting respectively the following conditions: $\Delta n_{eff\ min} \geq 0.9\times 10^{-3}$, $\Delta n_{eff\ min} \geq 1.3\times 10^{-3}$ and $\Delta n_{eff\ min} \geq 1.5\times 10^{-3}$.

Table 1 gives the parameters of index profiles of twelve examples of FMFs according to the exemplary embodiments of FIGS. 1 (Ex.1) and 2 (Ex.2 to Ex.12) according to the invention. The profile parameters were established at a wavelength of 633 nm.

TABLE 1

| Examples | R0 (µm) | R1 (µm) | R2 (µm) | R3 (µm) | Δn0 (10-3) | Δn1 (10-3) | Δn2 (1-3) | Acore (10-3 × µm) | A0/Atrap | S (10-3/µm) | r | nd |
|---|---|---|---|---|---|---|---|---|---|---|---|---|
| Ex. 1 | — | 5.54 | 8.54 | 19.75 | — | 13.5 | 0 | 190 | 0.000 | 4.5 | 0.65 | 1.4573 |
| Ex. 2 | 1.05 | 4.93 | 9.30 | 19.75 | 14.7 | 16.7 | -0.2 | 234 | 0.017 | 3.9 | 0.53 | 1.4573 |
| Ex. 3 | 1.55 | 5.51 | 9.30 | 19.75 | 14.2 | 16.2 | -0.2 | 250 | 0.023 | 5.9 | 0.70 | 1.4573 |
| Ex. 4 | 4.55 | 5.46 | 10.30 | 19.75 | 14.2 | 16.2 | -0.2 | 237 | 0.071 | 3.4 | 0.53 | 1.4573 |
| Ex. 5 | 1.55 | 4.93 | 9.30 | 19.75 | 14.7 | 16.7 | -0.2 | 232 | 0.025 | 3.9 | 0.53 | 1.4573 |
| Ex. 6 | 3.55 | 5.19 | 9.80 | 19.75 | 14.7 | 16.7 | -0.2 | 236 | 0.056 | 3.7 | 0.53 | 1.4573 |
| Ex. 7 | 3.55 | 5.46 | 10.30 | 19.75 | 14.2 | 16.2 | -0.2 | 241 | 0.055 | 3.4 | 0.53 | 1.4573 |
| Ex. 8 | 2.05 | 6.51 | 9.30 | 19.75 | 14.7 | 16.7 | -0.2 | 256 | 0.030 | 6.1 | 0.70 | 1.4573 |
| Ex. 9 | 3.05 | 6.86 | 9.80 | 19.75 | 14.2 | 16.2 | -0.2 | 258 | 0.044 | 5.6 | 0.70 | 1.4573 |
| Ex. 10 | 1.40 | 6.99 | 9.57 | 19.75 | 10.7 | 15.7 | -0.2 | 249 | 0.053 | 6.1 | 0.73 | 1.4573 |
| Ex. 11 | 3.57 | 5.94 | 10.62 | 19.75 | 12.7 | 15.7 | -0.2 | 241 | 0.081 | 3.4 | 0.56 | 1.4573 |
| Ex. 12 | 3.55 | 5.45 | 10.30 | 19.75 | 14.2 | 16.2 | -0.2 | 241 | 0.055 | 3.4 | 0.53 | 1.4411 |

It should be noted that only the 1$^{st}$ example (Ex.1) illustrates the example of FIG. 1 (i.e. the depressless weakly-coupled FMF), whereas the eleven other examples (Ex.2 to Ex.12) illustrates the example of FIG. 2 (i.e. the inner-depressed core weakly-coupled FMF). The 12$^{th}$ example (Ex.12) illustrates a trapezoidal profile identical to that of the 7$^{th}$ example (Ex.7) but with a refractive index $n_d$ of 1.4411 and an index-refractive difference $\Delta n1$ close to that of Silica. The results obtained with these profile parameters are set later in Table 2.

As discussed above in relation with background of the invention, DMA impacts mode-dependence losses with highest optical losses for the higher order modes. One origin of the high DMA can be due to the coupling of the highest order modes with cladding or leaky-modes when the effective indexes of the higher order modes are too close to the refractive index of the cladding. But when effective index difference between the higher order mode and the cladding modes is sufficiently high (preferably larger than $0.8 \times 10^{-3}$), the inventors attribute the origin of the unexpected extra losses occurring for the highest order modes to small angle light scattering (SALS) contributions. For each LP mode guided in the FMF at a wavelength of 1550 nm, more than 70% of losses are due to the Rayleigh scattering. The remaining losses cover, on the one hand, losses induced by absorption mechanisms (together losses by OH-peak, Infrared and Ultraviolet losses) and, on the other hand, losses induced by SALS. DMA is considered as being the difference in term of losses (comprising Rayleigh losses, losses by absorption and SALS losses) between the LP mode having the highest losses and the LP mode having the lowest losses.

One of the purposes of the invention is to reduce as greatest as possible the SALS component of the DMA in order to enhance the capacity of transmission of spatially-multiplexed optical signals on FMFs.

A parameter to evaluate the SALS component of the loss of each mode guided in the FMF has been established as follow (expressed in dB/km):

$$C_{el}(\text{mode } i) = 8 \times \pi \times \left(\frac{A_{core}}{\lambda}\right) \times 10^3 \times C_0(\text{mode } i)$$

with $$C_0(\text{mode } i) = \int\int \frac{(n(r)^2 - n(r+dr)^2)^2}{n(r+dr)^4} \times E_i(r,\theta)^2 r dr d\theta$$

r being the radial distance from the center of the optical and θ the azimuthal component in polar coordinates and $E_i(r, \theta)$ the mode field amplitude distribution at radius r and angle θ of mode i Designing such a trapezoid refractive-index profile with unexpected extra losses such as $C_{el}$ (mode i)≥0.05 dB/km or even more such $C_{el}$(mode i)≥0.015 dB/km allows to meet the specific needs for both reduced loss and weak-coupled FMFs (as shown in Table 2 below).

Moreover, in order to limit intra-mode non-linearity (and thus keep good optical guiding properties within the FMF), refractive index profile of the FMF is designed so that effective area $A_{eff}$ of each guided mode is larger than 80 μm².

Table 2 gives the characteristics $\Delta n_{eff\ min}$, DMA and, for each LP mode guided by the fiber, the unexpected extra loss coefficient $C_{el}$, the total loss TL resulting from absorption and diffusion loss mechanisms, the maximum bend loss BL (for a radius of 10 mm) and the effective area $A_{eff}$, with the index profiles of the twelve examples of FMFs of Table 1.

As used herein, the effective area of an optical fiber is the area of the optical fiber in which light is propagated and is determined at the specified mode, at a wavelength of 1550 nm, unless otherwise specified. The effective area $A_{eff\mu\nu}$ of mode $LP_{\mu\nu}$ is defined as follows:

If μ≠0:

$$A_{eff\mu\nu} = \frac{4\pi}{3} \frac{\left(\int_0^\infty |\psi_{\mu\nu}|^2 r dr\right)^2}{\int_0^\infty |\psi_{\mu\nu}|^4 r dr}$$

where $\psi_{\mu\nu}$ is the mode field amplitude distribution of the mode $LP_{\mu\nu}$ at the radius r, i.e. at the polar distance r in the polar coordinates of a point in a system of axes transverse to and centered relative to the fiber; and if μ=0:

$$A_{eff0\nu} = 2\pi \frac{\left(\int_0^\infty |\psi_{0\nu}|^2 r dr\right)^2}{\int_0^\infty |\psi_{0\nu}|^4 r dr}$$

Table 2 also provides assessment of the bending losses per turn of 10 mm bending radius for each LP modes. The bending loss data illustrated in Table 2 are collected according to measurements complying with the requirements of the IEC 60793-1-47 (ed.2.0), which is herein incorporated by reference. To properly characterize macrobending losses of the $LP_{01}$ mode, a two-meter portion of SMF can be spliced on the injection side of FMF under test to filter out the high order modes. For the high order modes, it is necessary to use mode converters at the input and the output of the FMF to correctly evaluate power in the desired modes. While characterization of FMFs is not standardized yet, loss of $LP_{01}$ mode can be measured according to IEC 60793-1-40 (ed1.0) standard (method A), which is herein incorporated by reference. However, in order to properly characterize the losses of the fundamental mode, a two-meter portion of SMF can be spliced on the injection side of FMF under test to filter out the high order modes. For the high order modes, it is necessary to use mode converters at the input and the output of the FMF to correctly evaluate power in the desired modes.

TABLE 2

| Examples | $\Delta n_{eff\ min}$ ($10^{-3}$) | DMA (dB/km) | LP modes | $\Delta n_{eff}$ ($10^{-3}$) | $A_{eff}$ (μm) | $C_{el}$ (dB/km) | TL (dB/km) | BL (dB/turn) |
|---|---|---|---|---|---|---|---|---|
| Ex. 1 | 1.0 | 0.015 | LP01 | 11.2 | 101 | 0.000 | 0.229 | <0.001 |
| | | | LP11 | 8.4 | 97 | 0.001 | 0.228 | <0.001 |
| | | | LP21 | 5.0 | 110 | 0.001 | 0.226 | <0.001 |
| | | | LP02 | 4.0 | 105 | 0.001 | 0.226 | <0.001 |
| | | | LP31 | 1.0 | 133 | 0.002 | 0.214 | <50 |
| Ex. 2 | 1.2 | 0.010 | LP01 | 14.0 | 97 | 0.002 | 0.245 | <0.001 |
| | | | LP11 | 11.1 | 91 | 0.003 | 0.245 | <0.001 |
| | | | LP21 | 7.4 | 103 | 0.004 | 0.243 | <0.001 |
| | | | LP02 | 6.2 | 101 | 0.006 | 0.243 | <0.001 |
| | | | LP31 | 3.1 | 118 | 0.006 | 0.239 | <0.001 |
| | | | LP12 | 1.8 | 136 | 0.005 | 0.235 | <10 |
| Ex. 3 | 1.3 | 0.002 | LP01 | 13.9 | 128 | 0.002 | 0.242 | <0.001 |
| | | | LP11 | 11.7 | 111 | 0.003 | 0.244 | <0.001 |
| | | | LP21 | 8.7 | 119 | 0.005 | 0.245 | <0.001 |
| | | | LP02 | 7.4 | 109 | 0.007 | 0.243 | <0.001 |
| | | | LP31 | 5.1 | 125 | 0.008 | 0.245 | <0.001 |
| | | | LP12 | 3.4 | 119 | 0.009 | 0.244 | <0.01 |
| | | | LP41 | 1.1 | 137 | 0.010 | 0.242 | <1 |

TABLE 2-continued

| Examples | $\Delta n_{eff\ min}$ (10⁻³) | DMA (dB/km) | LP modes | $\Delta n_{eff}$ (10⁻³) | $A_{eff}$ (μm) | $C_{el}$ (dB/km) | TL (dB/km) | BL (dB/turn) |
|---|---|---|---|---|---|---|---|---|
| Ex. 4 | 1.3 | 0.012 | LP01 | 12.7 | 136 | 0.003 | 0.237 | <0.001 |
|  |  |  | LP11 | 10.6 | 114 | 0.005 | 0.241 | <0.001 |
|  |  |  | LP21 | 7.8 | 121 | 0.006 | 0.241 | <0.001 |
|  |  |  | LP02 | 6.5 | 99 | 0.004 | 0.235 | <0.001 |
|  |  |  | LP31 | 4.3 | 132 | 0.007 | 0.238 | <0.001 |
|  |  |  | LP12 | 2.3 | 139 | 0.005 | 0.229 | <10 |
| Ex. 5 | 1.4 | 0.011 | LP01 | 13.8 | 100 | 0.003 | 0.244 | <0.001 |
|  |  |  | LP11 | 11.1 | 91 | 0.003 | 0.245 | <0.001 |
|  |  |  | LP21 | 7.4 | 103 | 0.004 | 0.243 | <0.001 |
|  |  |  | LP02 | 6.0 | 102 | 0.006 | 0.241 | <0.001 |
|  |  |  | LP31 | 3.1 | 118 | 0.006 | 0.238 | <0.001 |
|  |  | — | LP12 | 1.7 | 139 | 0.005 | 0.234 | <10 |
| Ex. 6 | 1.6 | 0.014 | LP01 | 13.3 | 123 | 0.003 | 0.241 | <0.001 |
|  |  |  | LP11 | 11.1 | 101 | 0.005 | 0.245 | <0.001 |
|  |  |  | LP21 | 7.9 | 110 | 0.006 | 0.244 | <0.001 |
|  |  |  | LP02 | 6.3 | 93 | 0.004 | 0.237 | <0.001 |
|  |  |  | LP31 | 4.0 | 123 | 0.006 | 0.240 | <0.001 |
|  |  | — | LP12 | 2.0 | 142 | 0.006 | 0.231 | <10 |
| Ex. 7 | 1.6 | 0.012 | LP01 | 13.0 | 135 | 0.003 | 0.239 | <0.001 |
|  |  |  | LP11 | 11.0 | 109 | 0.004 | 0.243 | <0.001 |
|  |  |  | LP21 | 8.1 | 119 | 0.005 | 0.242 | <0.001 |
|  |  |  | LP02 | 6.5 | 100 | 0.004 | 0.235 | <0.001 |
|  |  |  | LP31 | 4.5 | 131 | 0.006 | 0.239 | <0.001 |
|  |  |  | LP12 | 2.5 | 145 | 0.006 | 0.231 | <1 |
| Ex. 8 | 1.5 | 0.004 | LP01 | 14.2 | 132 | 0.003 | 0.244 | <0.001 |
|  |  |  | LP11 | 12.1 | 110 | 0.004 | 0.247 | <0.001 |
|  |  |  | LP21 | 9.2 | 118 | 0.006 | 0.248 | <0.001 |
|  |  |  | LP02 | 7.7 | 107 | 0.008 | 0.244 | <0.001 |
|  |  |  | LP31 | 5.6 | 123 | 0.008 | 0.248 | <0.001 |
|  |  |  | LP12 | 3.6 | 118 | 0.010 | 0.247 | <0.001 |
|  |  |  | LP41 | 1.5 | 134 | 0.011 | 0.246 | <1 |
| Ex. 9 | 1.6 | 0.006 | LP01 | 13.6 | 156 | 0.003 | 0.241 | <0.001 |
|  |  |  | LP11 | 11.9 | 122 | 0.004 | 0.244 | <0.001 |
|  |  |  | LP21 | 9.2 | 128 | 0.005 | 0.245 | <0.001 |
|  |  |  | LP02 | 7.6 | 107 | 0.007 | 0.239 | <0.001 |
|  |  |  | LP31 | 6.0 | 133 | 0.007 | 0.245 | <0.001 |
|  |  |  | LP12 | 3.9 | 128 | 0.010 | 0.242 | <0.001 |
|  |  |  | LP41 | 2.2 | 142 | 0.010 | 0.244 | <0.1 |
| Ex. 10 | 1.6 | 0.003 | LP01 | 13.4 | 149 | 0.006 | 0.243 | <0.001 |
|  |  |  | LP11 | 11.5 | 121 | 0.004 | 0.242 | <0.001 |
|  |  |  | LP21 | 8.8 | 129 | 0.005 | 0.242 | <0.001 |
|  |  |  | LP02 | 7.2 | 126 | 0.015 | 0.244 | <0.001 |
|  |  |  | LP31 | 5.5 | 133 | 0.007 | 0.243 | <0.001 |
|  |  |  | LP12 | 3.8 | 123 | 0.011 | 0.245 | <0.01 |
|  |  |  | LP41 | 1.8 | 142 | 0.010 | 0.242 | <10 |
| Ex. 11 | 1.3 | 0.074 | LP01 | 12.4 | 163 | 0.006 | 0.238 | <0.001 |
|  |  |  | LP11 | 10.8 | 120 | 0.006 | 0.242 | <0.001 |
|  |  |  | LP21 | 8.2 | 127 | 0.006 | 0.241 | <0.001 |
|  |  |  | LP02 | 6.2 | 103 | 0.005 | 0.229 | <0.001 |
|  |  |  | LP31 | 4.9 | 138 | 0.006 | 0.238 | <0.001 |
|  |  |  | LP12 | 2.6 | 154 | 0.008 | 0.229 | <10 |
|  |  |  | LP41 | 1.2 | 156 | 0.007 | 0.233 | <10 |
| Ex. 12 | 1.6 | 0.005 | LP01 | 13.0 | 135 | 0.003 | 0.168 | <0.001 |
|  |  |  | LP11 | 11.0 | 109 | 0.004 | 0.168 | <0.001 |
|  |  |  | LP21 | 8.1 | 119 | 0.005 | 0.169 | <0.001 |
|  |  |  | LP02 | 6.5 | 100 | 0.004 | 0.170 | <0.001 |
|  |  |  | LP31 | 4.5 | 131 | 0.006 | 0.171 | <0.001 |
|  |  |  | LP12 | 2.5 | 145 | 0.006 | 0.173 | <1 |

As is demonstrated here, thanks to profile parameters chosen according to our invention (gathered in Table 1), each FMF tested is able to guide at least five LP modes, with $\Delta n_{eff\ min} \geq 0.9 \times 10^{-3}$, $C_{el} \leq 0.015$ dB/km and DMA$\leq 0.02$ dB/km.

All examples in Tables 1 and 2 fulfill the structural requirements of:
- the surface integral $A_{core}$ is between $180 \times 10^{-3}$ and $270 \times 10^{-3}$ μm;
- the radius R2 is between 6.8 and 11.5 μm;
- the refractive-index difference $\Delta n1$ is between $13 \times 10^{-3}$ and $18 \times 10^{-3}$;
- the transition slope S is between $1.7 \times 10^{-3}$ and $12 \times 10^{-3}$ μm⁻¹.

In a further preferred embodiment, the value of radius R3 of the intermediate portion of the cladding is such that $R3 \geq 1.8 \times R2$.

According to a particular feature, the refractive index of the outer cladding ($n_{Cl}$) is chosen to be close to the refractive index of silica. In another exemplary embodiment, refractive index of the outer cladding ($n_{Cl}$) can be chosen between 1.437 and 1.458, or, alternatively, the refractive index of the optical core is chosen to be close to the index of silica to reduce the total losses of the FMF. So that, cladding refractive index ($n_{Cl}$) can be down-doped up to $-20 \times 10^{-3}$ with respect to Silica refractive index in order to provide ultra-low loss FMFs by reducing their Rayleigh contribution (thanks to a low-Ge or pure Silica core structure).

We now refer to Table 3 that gives the parameters of index profiles of six comparative examples (Comp.Ex.1 to Comp.Ex.6) of optical fibers out of the scope of the present invention, i.e. which do not satisfy the criteria of the present invention.

TABLE 3

| Examples | R1 (µm) | R2 (µm) | R3 (µm) | $\Delta n0$ ($10^{-3}$) | $\Delta n1$ ($10^{-3}$) | $\Delta n2$ ($10^{-3}$) | $A_{core}$ ($10^{-3}$ µm) | $A_0/A_{trap}$ | S ($10^{-3}$/µm) | r |
|---|---|---|---|---|---|---|---|---|---|---|
| Comp. Ex. 1 | 5.06 | 11.50 | 19.75 | — | 15.7 | −0.2 | 263 | 0.000 | 2.5 | 0.44 |
| Comp. Ex. 2 | 7.29 | 8.28 | 19.75 | — | 16.7 | −0.2 | 262 | 0.000 | 17.0 | 0.88 |
| Comp. Ex. 3 | 8.28 | 8.28 | 19.75 | — | 15.7 | −0.2 | 263 | 0.000 | ∞ | 1.00 |
| Comp. Ex. 4 | 8.01 | 8.01 | 19.75 | 14.7 | 16.7 | −0.2 | 260 | 0.041 | ∞ | 1.00 |
| Comp. Ex. 5 | 2.51 | 11.64 | 19.75 | 11.5 | 13.5 | −0.2 | 190 | 0.020 | 1.5 | 0.22 |
| Comp. Ex. 6 | 5.73 | 10.82 | 19.75 | 10.7 | 15.7 | −0.2 | 228 | 0.131 | 3.1 | 0.53 |

As for Table 2, Table 4 gives the characteristics $\Delta n_{eff\,min}$, DMA and, for each LP mode guided by the fiber, the unexpected extra loss coefficient $C_{el}$, the total loss TL resulting from absorption and diffusion loss mechanisms, the maximum bend loss BL (for a radius of 10 mm) and the effective area $\Delta_{eff}$, with the index profiles of the six examples of optical fibers of above Table 3.

Comp.Ex.1 is an example of optical fiber having a trapezoid shape core profile ($A_0/A_{trap}=0$) characterized by a slop S that does not satisfy the 'Criterion 1'. As a consequence, $\Delta n_{eff\,min}$ in between LP21 and LP02 modes is too small.

Comp.Ex.2 is an example of optical fiber having a trapezoid shape core profile with depressed center characterized by a slope S that is too large. As a consequence, the core-cladding transition is too sharp for the highest order modes and unexpected extra loss coefficient $C_{el}$ of LP12 and LP41 is not desirable ($C_{el}$>0.015 dB/km).

TABLE 4

| Examples | $\Delta n_{eff\,min}$ ($10^{-3}$) | DMA (dB/km) | LP modes | $\Delta n_{eff}$ ($10^{-3}$) | $A_{eff}$ (µm) | $C_{el}$ (dB/km) | TL (dB/km) | BL (dB/turn) |
|---|---|---|---|---|---|---|---|---|
| Comp. Ex. 1 | 0.8 | 0.008 | LP01 | 13.4 | 112 | 0.001 | 0.240 | <0.001 |
| | | | LP11 | 11.0 | 112 | 0.002 | 0.239 | <0.001 |
| | | | LP21 | 7.9 | 129 | 0.004 | 0.238 | <0.001 |
| | | | LP02 | 7.2 | 123 | 0.004 | 0.239 | <0.001 |
| | | | LP31 | 4.5 | 146 | 0.005 | 0.233 | <0.001 |
| | | | LP12 | 3.4 | 153 | 0.004 | 0.232 | <0.1 |
| Comp. Ex. 2 | 1.0 | 0.015 | LP01 | 14.5 | 120 | 0.003 | 0.246 | <0.001 |
| | | | LP11 | 12.2 | 111 | 0.007 | 0.250 | <0.001 |
| | | | LP21 | 9.2 | 116 | 0.012 | 0.254 | <0.001 |
| | | | LP02 | 8.2 | 100 | 0.013 | 0.256 | <0.001 |
| | | | LP31 | 5.6 | 119 | 0.017 | 0.259 | <0.001 |
| | | | LP12 | 3.7 | 107 | 0.019 | 0.259 | <0.01 |
| | | | LP41 | 1.5 | 126 | 0.023 | 0.262 | <10 |
| Comp. Ex. 3 | 1.0 | 0.069 | LP01 | 14.6 | 125 | 0.009 | 0.253 | <0.001 |
| | | | LP11 | 12.4 | 115 | 0.023 | 0.266 | <0.001 |
| | | | LP21 | 9.5 | 120 | 0.040 | 0.283 | <0.001 |
| | | | LP02 | 8.6 | 103 | 0.045 | 0.288 | <0.001 |
| | | | LP31 | 6.0 | 123 | 0.059 | 0.302 | <0.001 |
| | | | LP12 | 4.2 | 109 | 0.066 | 0.309 | <0.01 |
| | | | LP41 | 2.0 | 129 | 0.080 | 0.321 | <10 |
| Comp. Ex. 4 | 1.7 | 0.076 | LP01 | 14.2 | 149 | 0.015 | 0.256 | <0.001 |
| | | | LP11 | 12.3 | 117 | 0.028 | 0.271 | <0.001 |
| | | | LP21 | 9.6 | 121 | 0.046 | 0.289 | <0.001 |
| | | | LP02 | 7.9 | 101 | 0.054 | 0.289 | <0.001 |
| | | | LP31 | 6.1 | 123 | 0.068 | 0.310 | <0.001 |
| | | | LP12 | 3.9 | 115 | 0.080 | 0.317 | <0.001 |
| | | | LP41 | 2.2 | 129 | 0.092 | 0.331 | <0.01 |
| Comp. Ex. 5 | 0.4 | 0.013 | LP01 | 10.3 | 86 | 0.002 | 0.228 | <0.001 |
| | | | LP11 | 7.1 | 99 | 0.002 | 0.223 | <0.001 |
| | | | LP21 | 3.6 | 137 | 0.002 | 0.215 | <0.01 |
| | | | LP02 | 3.3 | 171 | 0.002 | 0.216 | <1 |
| Comp. Ex. 6 | 0.5 | 0.022 | LP01 | 11.9 | 174 | 0.012 | 0.244 | <0.001 |
| | | | LP11 | 10.5 | 119 | 0.010 | 0.246 | <0.001 |
| | | | LP21 | 8.0 | 127 | 0.008 | 0.243 | <0.001 |
| | | | LP02 | 5.2 | 113 | 0.008 | 0.223 | <0.001 |
| | | | LP31 | 4.8 | 139 | 0.007 | 0.238 | <0.001 |
| | | | LP12 | 2.2 | 175 | 0.012 | 0.228 | <50 |
| | | | LP41 | 1.1 | 160 | 0.006 | 0.231 | <10 |

Comp.Ex.3 is an example of optical fiber having a step index profile. The unexpected extra loss coefficient $C_{el}$ for the modes LP21, LP02, LP31, LP12 & LP41 is not desirable since upper than 0.02 dB/km. Consequently, DMA is too high (DMA>0.05 dB/km) to meet the fiber communication capacity demands.

Comp.Ex.4 is an example of optical fiber having a step index profile with depressed center part allowing to get an improved and sufficiently high minimal inter-mode effective index difference compared to Com. Ex.3 ($\Delta n_{eff\ min}$>1.5×$10^{-3}$) but too much high unexpected extra losses ($C_{el}$>0.02 dB/km). Consequently, DMA is too high (DMA>0.05 dB/km) to meet the fiber communication capacity demands.

Comp.Ex.5 is an example of optical fiber having a trapezoid core shape profile with depressed center characterized by a slope S that is too small and does not satisfy the 'Criterion 1'. As a consequence, only four LP modes are guided and $\Delta n_{eff\ min}$ in between LP21 and LP02 modes is too small.

Comp.Ex.6 is an example of optical fiber having a trapezoid core shape profile with depressed center characterized by a slop Se that does not satisfy the 'Criterion 1' and a ratio $A_0/A_{trap}$ upper than 0.1. As a consequence, $\Delta n_{eff\ min}$ in between LP02 and LP31 modes is too small.

The invention claimed is:

1. An optical fiber comprising an optical core surrounded by an optical cladding, wherein the optical core has a refractive-index profile $\Delta n(r)$ of trapezoid-like shape, as a function of a radial distance r from the center of the optical core, the optical core having a center part of radius R1 and a transition part ranges from the radius R1 to a radius R2, such that R2>R1, said refractive-index profile being defined by:

a surface integral $A_{core}$ defined as follows: $A_{core}=2\int_0^{R2}\Delta n(r)\cdot dr$ a transition slope S defined as follows:

$$S = \left|\frac{\Delta n2 - \Delta n1}{R2 - R1}\right|$$

with:

$\Delta n1$, the refractive-index difference of the center part of the optical core with respect to the outer optical cladding;

$\Delta n2$, the refractive-index difference of a cladding part, adjacent to the optical core, with respect to the outer optical cladding;

and wherein:

the surface integral $A_{core}$ is between $180\times10^{-3}$ and $270\times10^{-3}$ μm;

the radius R2 is between 6.8 and 11.5 μm;

the transition slope S is between $1.7\times10^{-3}$ and $12\times10^{-3}$ μm$^{-1}$;

the center part of the optical core comprises a region of depressed refractive index, called inner depressed core, ranging from the center of the optical core to radius R0 and having a refractive-index difference with respect to the outer optical cladding $\Delta n0$ such that $\Delta n1>\Delta n0\geq(\Delta n1-6\times10^{-3})$, said inner depressed core having a surface integral $A_0$ and assuming a surface integral $A_{trap}$ as the surface integral of depressless core's refractive-index profile, said surface integrals $A_0$ and $A_{trap}$ being defined as follows:

$A_0=2\int_0^{R0}(\Delta n1-\Delta n(r))dr$ $A_{trap}=2(\Delta n1\cdot R1+\int_{R1}^{R2}\Delta n(r)dr)$ with a ratio $A_0/A_{trap}$ lower than or equal to 0.01.

2. The optical fiber according to claim 1, wherein the refractive-index difference $\Delta n1$ is between $13\times10^{-3}$ and $18\times10^{-3}$.

3. The optical fiber according to claim 1, wherein a ratio R1/R2 of said center part's radius to said transition part's radius is between 0.30 and 0.85.

4. The optical fiber according to claim 1, wherein the refractive-index difference $\Delta n2$ is between $-1\times10^{-3}$ and $1\times10^{-3}$.

5. The optical fiber according to claim 1, wherein the transition slope S satisfies the following inequality:

$$S \geq J\left(\frac{A_0}{A_{trap}}\right)^2 + K\left(\frac{A_0}{A_{trap}}\right) + L$$

with J=650×$10^{-3}$ μm$^{-1}$, K=−78×$10^{-3}$ μm$^{-1}$ and L=4.0×$10^{-3}$ μm$^{-1}$.

6. The optical fiber according to claim 1, wherein the transition slope S satisfies the following inequality:

$$S \geq J\left(\frac{A_0}{A_{trap}}\right)^2 + K\left(\frac{A_0}{A_{trap}}\right) + L$$

with J=1900×$10^{-3}$ μm$^{-1}$, K=−209×$10^{-3}$ μm$^{-1}$ and L=7.6×$10^{-3}$ μm$^{-1}$.

7. The optical fiber according to claim 1, wherein the transition slope S satisfies the following inequality:

$$S \geq J\left(\frac{A_0}{A_{trap}}\right)^2 + K\left(\frac{A_0}{A_{trap}}\right) + L$$

with J=5800×$10^{-3}$ μm$^{-1}$, K=−580×$10^{-3}$ μm$^{-1}$ and L=17×$10^{-3}$ μm$^{-1}$.

8. The optical fiber according to claim 1, wherein each Linear Polarization mode guided by said optical fiber has an effective area $A_{eff}$, such that $A_{eff}$>80 μm$^2$.

9. The optical fiber according to claim 1, wherein at least five linear polarization modes are guided.

10. The optical fiber according to claim 1, wherein a differential mode attenuation, DMA, for all the modes guided by said optical fiber is such that: DMA≤0.050 dB/km.

11. The optical fiber according to claim 1, wherein a transition part of the trapezoid-like core refractive-index profile comprises at least one dopant material of concentration gradually changing as a function of the radial distance r from a concentration in the center part of the optical core to a concentration in said cladding part adjacent to the optical core.

12. The optical fiber according to claim 11, wherein said at least one dopant material comprises at least one of: Germanium oxide, Phosphorus oxide, Boron oxide, and Fluorine.

13. The optical fiber according to claim 1, wherein the optical cladding has a refractive index between 1.437 and 1.458.

14. An optical transmission system comprising at least one optical fiber according to claim 1.

15. The optical fiber according to claim 1, wherein the refractive-index difference $\Delta n2$ is between $-0.5\times10^{-3}$ and $0.5\times10^{-3}$.

16. The optical fiber according to claim 1, wherein a differential mode attenuation, DMA, for all the modes guided by said optical fiber is such that: DMA≤0.020 dB/km.

* * * * *